(12) United States Patent
Norieda et al.

(10) Patent No.: US 12,499,639 B2
(45) Date of Patent: Dec. 16, 2025

(54) VIRTUAL SPACE CHANGING APPARATUS, VIRTUAL SPACE CHANGING METHOD, AND STORAGE MEDIUM

(71) Applicant: NEC Corporation, Tokyo (JP)

(72) Inventors: Shin Norieda, Tokyo (JP); Shogo Akasaki, Tokyo (JP); Katsuhiko Kumagai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 18/221,673

(22) Filed: Jul. 13, 2023

(65) Prior Publication Data

US 2024/0020938 A1 Jan. 18, 2024

(30) Foreign Application Priority Data

Jul. 14, 2022 (JP) ................................. 2022-113350

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/013* (2013.01); *G06T 7/70* (2017.01); *G06T 13/40* (2013.01);
(Continued)

(58) Field of Classification Search
CPC ........... G06T 19/20; G06T 7/70; G06T 13/40; G06T 2219/2012; G06T 2219/2016;
(Continued)

(56) References Cited

U.S. PATENT DOCUMENTS 8,200,578 B2 6/2012 Hill et al.
2007/0035548 A1 2/2007 Jung et al.
(Continued)

FOREIGN PATENT DOCUMENTS

JP 2002-197376 A 7/2002
JP 2009-223650 A 10/2009
(Continued)

OTHER PUBLICATIONS

U.S. Appl. No. 18/221,204, filed Jul. 12, 2023, First-Named Inventor: Shin Norieda.
(Continued)

*Primary Examiner* — Chong Wu
(74) *Attorney, Agent, or Firm* — Sughrue Mion, PLLC

(57) ABSTRACT

In order to attain an example object of providing a virtual space which is more suitable for a user, a virtual space changing apparatus includes: an acquisition section that acquires position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user; and a virtual space updating section that changes a virtual space or a state of the virtual space based on the position information, the feeling information, and the virtual space record information.

10 Claims, 8 Drawing Sheets

(51) Int. Cl.
*G06T 7/70* (2017.01)
*G06T 13/40* (2011.01)
*G06V 10/60* (2022.01)

(52) U.S. Cl.
CPC ...... *G06V 10/60* (2022.01); *G06T 2219/2012* (2013.01); *G06T 2219/2016* (2013.01)

(58) Field of Classification Search
CPC ....... G06T 2219/024; G06T 2219/2024; G06F 3/013; G06F 3/012; G06F 3/011; G06V 10/60; G06V 40/174
See application file for complete search history.

(56) References Cited

U.S. PATENT DOCUMENTS

| | | |
|---|---|---|
| 2010/0241512 A1 | 9/2010 | Tirpak et al. |
| 2012/0123890 A1 | 5/2012 | Nathan |
| 2018/0035100 A1* | 2/2018 | Shu ............... H04N 23/69 |
| 2018/0357836 A1* | 12/2018 | Ishiguro ............. G06F 3/012 |

FOREIGN PATENT DOCUMENTS

| | | |
|---|---|---|
| JP | 2012-008638 A | 1/2012 |
| JP | 2017-167985 A | 9/2017 |
| JP | 2018-013947 A | 1/2018 |
| JP | 2018-522342 A | 8/2018 |
| JP | 2019-106192 A | 6/2019 |
| JP | 2019-160112 A | 9/2019 |
| JP | 2022-036690 A | 3/2022 |

OTHER PUBLICATIONS

US Office Action for U.S. Appl. No. 18/221,204, mailed on Dec. 18, 2024.

Moojan Ghafurian et al., "Improving Humanness of Virtual Agents and Users' Cooperation Through Emotions", IEEE Transactions on Affective Computing, vol. 14, No. 2, 1461-1471 (Year: 2021).

* cited by examiner

VIRTUAL SPACE CHANGING APPARATUS, VIRTUAL SPACE CHANGING METHOD, AND STORAGE MEDIUM

This Nonprovisional application claims priority under 35 U.S.C. § 119 on Patent Application No. 2022-113350 filed in Japan on Jul. 14, 2022, the entire contents of which are hereby incorporated by reference.

TECHNICAL FIELD

The present invention relates to a virtual space changing apparatus, a virtual space changing method, and a storage medium.

BACKGROUND ART

A technique for changing a virtual space that is provided to a user is known. Patent Literature 1 discloses an information processing apparatus that analyzes, in a first virtual world, a behavior of an avatar which acts in accordance with control by a user, that derives a feature of the user, and that decides a second virtual world according to the derived feature of the user.

CITATION LIST

Patent Literature

[Patent Literature 1]
Japanese Patent Application Publication Tokukai No. 2002-197376

SUMMARY OF INVENTION

Technical Problem

In recent years, various kinds of information pertaining to a user can be acquired in a virtual space. For example, it is possible to acquire information indicating where the user has been positioned in the virtual space. There is a need for a technique for providing a virtual space which is more suitable for a user using such various kinds of information.

An example aspect of the present invention is accomplished in view of the above problem, and its example object is to provide a virtual space which is more suitable for a user.

Solution to Problem

A virtual space changing apparatus according to an example aspect of the present invention includes at least one processor, the at least one processor carrying out: an acquisition process of acquiring position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user; a virtual space changing process of changing a virtual space which is being used by the user or a state of the virtual space based on the position information, the feeling information, and the virtual space record information; and an output process of outputting reason information, the reason information (i) including information that has contributed to the changing in the virtual space changing process among pieces of information which have been acquired in the acquisition process and (ii) indicating a reason that the virtual space or the state of the virtual space has been changed in the virtual space changing process.

A virtual space changing method according to an example aspect of the present invention includes: acquiring, by a virtual space changing apparatus, position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user; changing, by the virtual space changing apparatus, a virtual space which is being used by the user or a state of the virtual space based on the position information, the feeling information, and the virtual space record information; and outputting reason information by the virtual space changing apparatus, the reason information (i) including information that has contributed to the changing of the virtual space or the state of the virtual space among pieces of information which have been acquired in the acquiring and (ii) indicating a reason that the virtual space or the state of the virtual space has been changed.

A storage medium according to an example aspect of the present invention is a non-transitory storage medium storing a program for causing a computer to function as a virtual space changing apparatus, the program causing the computer to carry out: an acquisition process of acquiring position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user; a virtual space changing process of changing a virtual space which is being used by the user or a state of the virtual space based on the position information, the feeling information, and the virtual space record information; and an output process of outputting reason information, the reason information (i) including information that has contributed to the changing in the virtual space changing process among pieces of information which have been acquired in the acquisition process and (ii) indicating a reason that the virtual space or the state of the virtual space has been changed in the virtual space changing process.

Advantageous Effects of Invention

According to an example aspect of the present invention, it is possible to provide a virtual space which is more suitable for a user.

EXAMPLE EMBODIMENTS

First Example Embodiment

The following description will discuss a first example embodiment of the present invention in detail with reference to the drawings. The present example embodiment is a basic form of example embodiments described later.

(Configuration of Virtual Space Changing Apparatus 1)

Figure 1:
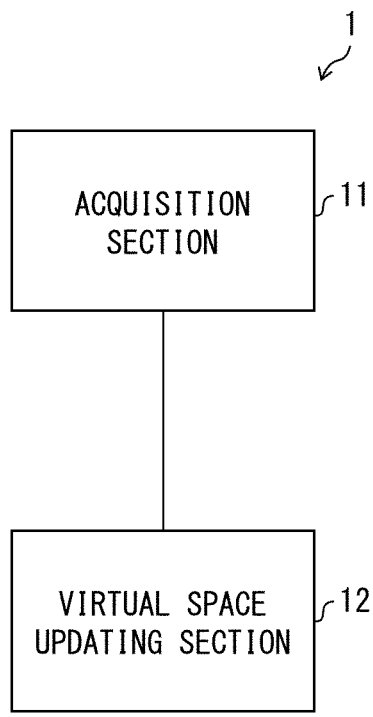
FIG. 1 is a block diagram illustrating a configuration of a virtual space changing apparatus according to a first example embodiment of the present invention.

The following description will discuss a configuration of a virtual space changing apparatus 1 according to the present example embodiment with reference to FIG. 1. FIG. 1 is a block diagram illustrating a configuration of the virtual space changing apparatus 1 according to the present example embodiment.

The virtual space changing apparatus 1 is an apparatus that changes a virtual space which is being used by a user or a state of the virtual space. As illustrated in FIG. 1, the virtual space changing apparatus 1 includes an acquisition section 11 and a virtual space updating section 12. The acquisition section 11 and the virtual space updating section 12 are configured to realize the acquisition means and the virtual space changing means in the present example embodiment, respectively.

The acquisition section 11 acquires position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user. The acquisition section 11 supplies the acquired position information, feeling information, and virtual space record information to the virtual space updating section 12.

The virtual space updating section 12 changes the virtual space which is being used by the user or the state of the virtual space based on the position information, the feeling information, and the virtual space record information.

As described above, the virtual space changing apparatus 1 according to the present example embodiment employs the configuration of including: the acquisition section 11 that acquires position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user; and the virtual space updating section 12 that changes a virtual space which is being used by the user or a state of the virtual space based on the position information, the feeling information, and the virtual space record information.

As such, the virtual space changing apparatus 1 of the present example embodiment refers to a position of the user in the virtual space or a record of the position, a feeling of the user or a record of the feeling, and a record of the virtual space which has been used by one or both of the user and another user. Therefore, according to the virtual space changing apparatus 1 of the present example embodiment, the virtual space which is being used by the user or the state of the virtual space is changed based on various pieces of information, and this makes it possible to provide a virtual space which is more suitable for the user.

(Flow of Virtual Space Changing Method S1)

Figure 2:
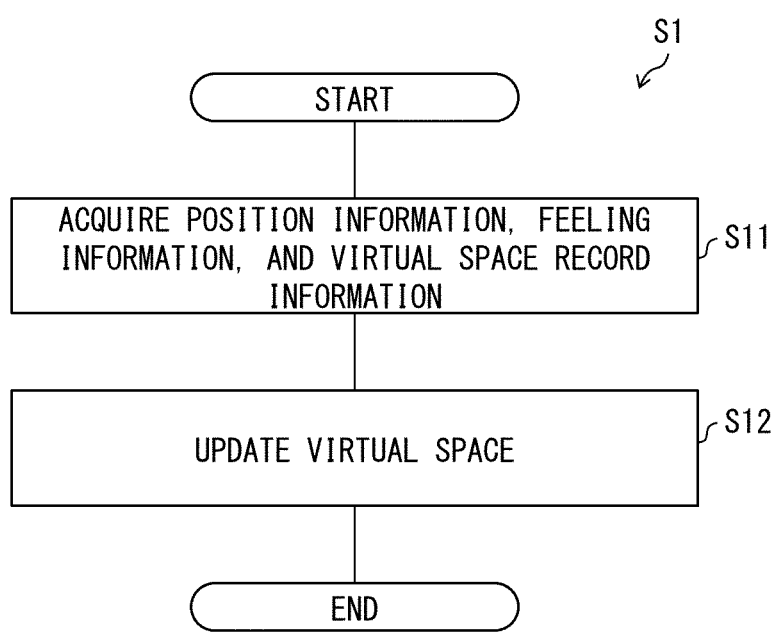
FIG. 2 is a flowchart illustrating a flow of a virtual space changing method according to the first example embodiment of the present invention.

The following description will discuss a flow of a virtual space changing method S1 according to the present example embodiment with reference to FIG. 2. FIG. 2 is a flowchart illustrating the flow of the virtual space changing method S1 according to the present example embodiment.

(Step S11)

In step S11, the acquisition section 11 acquires position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user. The acquisition section 11 supplies the acquired position information, feeling information, and virtual space record information to the virtual space updating section 12.

(Step S12)

In step S12, the virtual space updating section 12 changes the virtual space which is being used by the user or the state of the virtual space based on the position information, the feeling information, and the virtual space record information.

As described above, the virtual space changing method S1 according to the present example embodiment employs the configuration of including: acquiring, by the acquisition section 11, position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user; and changing, by the virtual space updating section 12, a virtual space which is being used by the user or a state of the virtual space based on the position information, the feeling information, and the virtual space record information. Therefore, according to the virtual space changing method S1 of the present example embodiment, an example advantage similar to that of the foregoing virtual space changing apparatus 1 is brought about.

Second Example Embodiment

The following description will discuss a second example embodiment of the present invention in detail with reference to the drawings. The same reference numerals are given to constituent elements which have functions identical with those described in the first example embodiment, and descriptions as to such constituent elements are omitted as appropriate.

(Overview of Information Processing System 1)

The information processing system 100 is a system that changes a virtual space which is being used by the user or a state of the virtual space. Here, the "virtual space which is being used by the user" is a virtual space indicated by an image which is currently displayed on a user terminal 3 which is used by the user. In order to carry out the change, the information processing system 100 refers to virtual space record information, position information, feeling information, and the like. The virtual space record information is information indicating a record of a virtual space which has been used by the user (or another user). The record of the virtual space may include a record of an object included in the virtual space and a record of an avatar disposed in the virtual space. Here, the "virtual space which has been used by the user (or another user)" is a virtual space indicated by an image which was displayed before the present time on the user terminal 3 which is used by the user (or another user). Hereinafter, in some cases, a case in which the user "uses" a virtual space may be referred to as a case in which the user "visits (or comes to)" a virtual space.

In some cases, the virtual space may be constituted by a plurality of virtual spaces. For example, a virtual space indicating a town is constituted by virtual spaces indicating a store, a school, a park, a road, and the like, respectively. For example, a virtual space indicating a store of a financial institution is constituted by virtual spaces indicating a waiting room, a business negotiation space, a reception room, and the like, respectively. "Changing a virtual space" refers to, for example, changing a virtual space (e.g., a virtual space indicating a waiting room) which is being used by the user into a different virtual space (e.g., a virtual space of a waiting room different from the virtual space of the waiting room which is being used by the user, or a virtual space indicating a reception room). "Changing a state of a virtual space" refers to, for example, changing a constituent element or a setting of a virtual space which is being used by the user. Examples of the "changing a state of a virtual space" include changing or moving an object disposed in a waiting room or changing an environment of the waiting room.

In the present example embodiment, "changing a virtual space or changing a state of a virtual space" will be hereinafter referred to also as "updating a virtual space".

The following description will discuss a virtual space which is used by a person in charge of dealing with the user to provide a service to the user, as an example of a virtual space which is changed in the information processing system 100. Examples of a service provided in a virtual space include a service of selling goods, a financial service, and an educational service.

(Configuration of Information Processing System 100)

Figure 3:
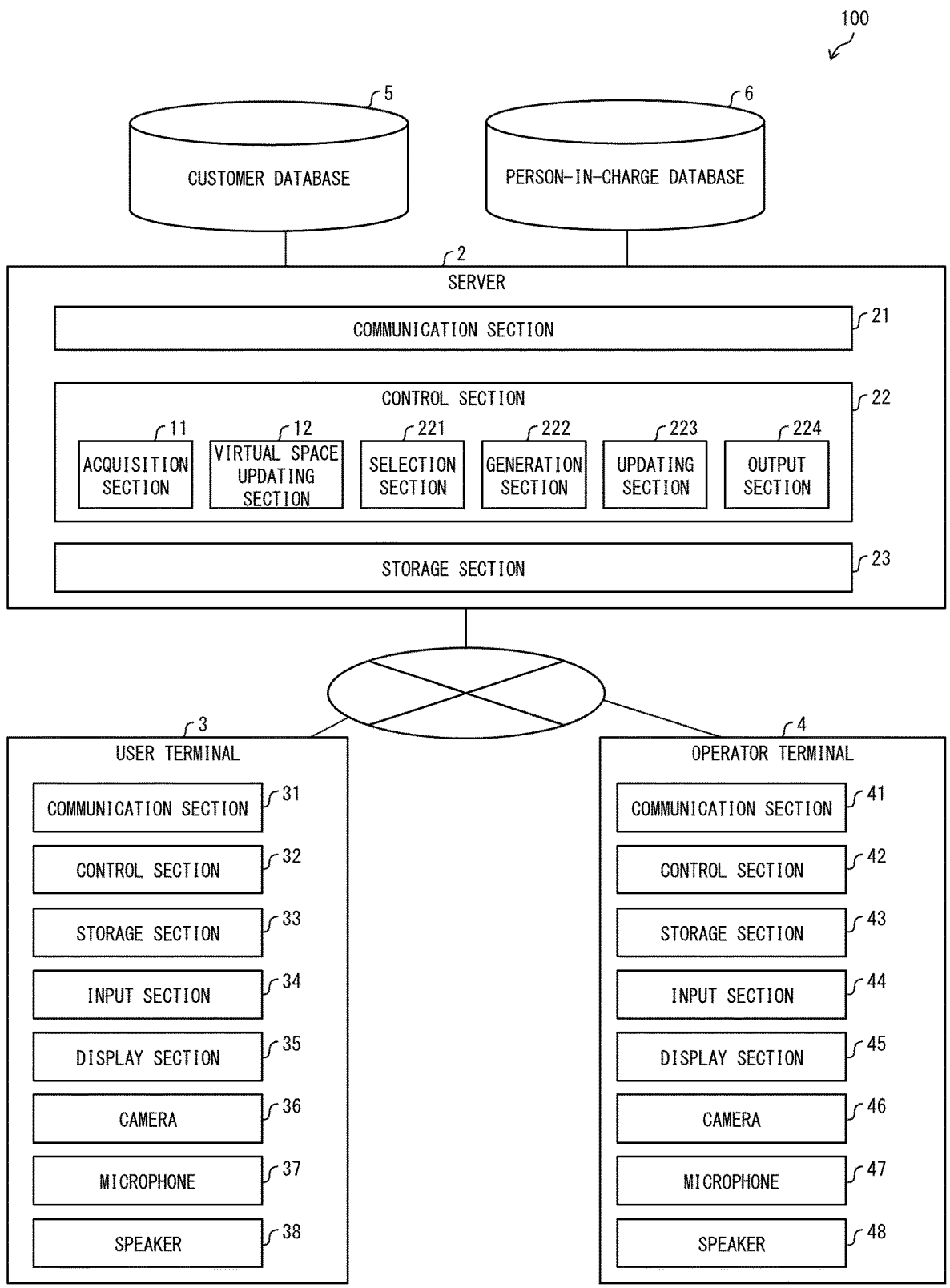
FIG. 3 is a block diagram illustrating a configuration of an information processing system according to a second example embodiment of the present invention.

The following description will discuss a configuration of the information processing system 100 according to the present example embodiment, with reference to FIG. 3. FIG. 3 is a block diagram illustrating the configuration of the information processing system 100 according to the present example embodiment.

As illustrated in FIG. 3, the information processing system 100 is configured to include a server 2, a user terminal 3, an operator terminal 4, a customer database 5, and a person-in-charge database 6. The server 2 and the user terminal 3 are configured to realize the virtual space changing apparatus in the present example embodiment.

In the information processing system 100, as illustrated in FIG. 3, the server 2, the user terminal 3, and the operator terminal 4 are communicably connected to each other via a network. In the information processing system 100, as illustrated in FIG. 3, the customer database 5 and the person-in-charge database 6 are connected to the server 2. The server 2 updates pieces of information which are stored in the customer database 5 and the person-in-charge database 6, and acquires pieces of information which are stored in the customer database 5 and the person-in-charge database 6.

Examples of the user terminal 3 and the operator terminal 4 include a personal computer (PC), a tablet, a smart phone, a wearable terminal, and a head mounted display (HMD). As an example, the following description will discuss a case where the user terminal 3 (or the operator terminal 4) is a PC, a tablet, or a smart phone. In this case, the user (or the person in charge) inputs a uniform resource locator (URL) for using a virtual space into a browser that operates on the user terminal 3 (or the operator terminal 4), and thus the user (or the person in charge) can use the virtual space.

For example, in the information processing system 100, an avatar of the user and an avatar of the person in charge are disposed on the virtual space. The user operates the avatar of the user via the user terminal 3, and the person in charge operates the avatar of the person in charge via the operator terminal 4. Here, the person in charge of dealing with the user may be a person or a program (bot).

(Configuration of Server 2)

As illustrated in FIG. 3, the server 2 includes a communication section 21, a control section 22, and a storage section 23.

The communication section 21 is a communication module that communicates with an apparatus which is connected to the server 2. For example, the communication section 21 causes the customer database 5 or the person-in-charge database 6 to store information supplied from the control section 22. Moreover, the communication section 21 supplies information stored in the customer database 5 or information stored in the person-in-charge database 6 to the control section 22. Furthermore, the communication section 21 outputs, to the user terminal 3 and the operator terminal 4 which are connected via a network, information supplied from the control section 22. In addition, the communication section 21 supplies pieces of information output from the user terminal 3 and the operator terminal 4 to the control section 22.

The storage section 23 stores data which the control section 22 refers to. For example, the storage section 23 stores position information, line-of-sight target information, purpose information, virtual space record information, and feeling information.

(Function of Control Section 22)

The control section 22 controls constituent elements included in the server 2. As illustrated in FIG. 3, the control section 22 functions also as an acquisition section 11, a virtual space updating section 12, a selection section 221, a generation section 222, an updating section 223, and an output section 224. The acquisition section 11, the virtual space updating section 12, and the output section 224 are configuration examples that realize the acquisition means, the virtual space changing means, and the output means, respectively, in the present example embodiment.

The acquisition section 11 acquires information supplied from the communication section 21. For example, the acquisition section 11 acquires position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user.

Moreover, the acquisition section 11 acquires line-of-sight target information including a line-of-sight target existing in a line-of-sight direction of the user or a record of the line-of-sight target. Moreover, the acquisition section 11 acquires user feature information pertaining to a feature of the user.

The acquisition section 11 causes the storage section 23 to store the acquired information.

Here, the record of the position of the user in the virtual space indicated by the position information may include, for example, the following information. For example, the record of the position of the user in the virtual space may include (i) a record of a position of a user, who is visiting the virtual space, from a point in time when the user came to the virtual space to this point in time. The record of the position of the user in the virtual space may include (ii) a record of a position of a user in the virtual space during a period in which the user visited the virtual space in the past. The record of the position of the user in the virtual space may include (iii) a record of a position of a user in an overall virtual space (e.g., a town), who is visiting the overall virtual space including the virtual space (e.g., a store), from a point in time when the user came to the overall virtual space to when the user comes to the virtual space. The record of the position of the user in the virtual space may include (iv) a record of a position of a user in another virtual space during a period in which the user visited that another virtual space in order to use another service. For example, in a configuration in which the server 2 generates a virtual space that provides a financial service, the acquisition section 11 may acquire position information indicating a record of a position of a user in a virtual space that provides an educational service, which has been generated by the server 2 or another server. In the descriptions below also, the "record" is not limited to a record in a virtual space that is provided by the server 2.

Moreover, the feeling information may include, for example, the following information. For example, the record of the feeling may include (i) a record of a feeling of a user, who is visiting the virtual space, from a point in time when the user came to the virtual space to this point in time. The record of the feeling may include (ii) a record of a feeling of a user during a period in which the user visited the virtual space in the past. The record of the feeling may include (iii) a record of a feeling of a user, who is visiting an overall virtual space (e.g., a town) including the virtual space (e.g., a store), from a point in time when the user came to the overall virtual space to when the user comes to the virtual space. The record of the feeling may include (iv) a record of a feeling of a user during a period in which the user visited another virtual space in order to use another service. For example, in a configuration in which the server 2 generates a virtual space that provides a financial service, the acquisition section 11 may acquire feeling information indicating a record of a feeling of a user in a virtual space that provides an educational service, which has been generated by the server 2 or another server. In the descriptions below also, the "record" is not limited to a record in a virtual space that is provided by the server 2.

An example of information included in a record of a virtual space which has been used by one or both of a user and another user, which is indicated by virtual space record information, can be similarly described by, in the foregoing descriptions of (i) through (iv), replacing the term "user" with "one or both of the user and another user" and replacing the term "virtual position" with "virtual space which has been used by one or both of the user and another user". The virtual space record information is stored in the customer database 5 which will be described later.

An example of information included in a record (indicated by line-of-sight target information) of a line-of-sight target which exists in a line-of-sight direction can be similarly described by replacing "a position of the user in the virtual space" with "a line-of-sight target existing in the line-of-sight direction" in the foregoing descriptions of (i) through (iv).

Note that information indicating a record of a position among the position information, information indicating a record of a line-of-sight target among the line-of-sight target information, or information indicating a record of a feeling among the feeling information can be stored in the customer database 5 which will be described later. The acquisition section 11 may acquire both of or any one of information indicating a current position and information indicating a record of the position. The acquisition section 11 may acquire both of or any one of information of a current line-of-sight target and information indicating a record of the line-of-sight target. The acquisition section 11 may acquire both of or any one of information indicating a current feeling and information indicating a record of the feeling.

The virtual space updating section 12 updates a virtual space which is being used by the user. For example, the virtual space updating section 12 updates, based on position information, feeling information, and virtual space record information which are stored in the storage section 23, the virtual space which is being used by the user. Details of the process in which the virtual space updating section 12 updates the virtual space will be described later.

The selection section 221 selects a person in charge of dealing with the user in the virtual space. For example, the selection section 221 selects, based on position information and line-of-sight target information stored in the storage section 23, a person in charge of dealing with the user in the virtual space from among persons in charge indicated by person-in-charge information that is stored in the person-in-charge database 6. The following description will discuss an example of the process in which the selection section 221 selects a person in charge. In this example, the position information indicates that the user is or was positioned in front of a notice about a product A, the notice being an object included in the virtual space. Moreover, the line-of-sight target information indicates that the user is or was looking at the notice about the product A. In this case, the selection section 221 selects a person in charge who is specialized in the product A based on the position information and the line-of-sight target information from among persons in charge indicated by person-in-charge information that is stored in the person-in-charge database 6.

The generation section 222 generates a virtual space. Moreover, the generation section 222 disposes an object in the generated virtual space. Examples of the object include a notice pertaining to a service that is provided in the virtual space. Moreover, the generation section 222 generates an avatar of the user which acts in accordance with an operation by the user of the user terminal 3. Furthermore, the generation section 222 generates an avatar of a person in charge which acts in accordance with an operation by the person in charge who is the user of the operator terminal 4 and who has been selected by the selection section 221.

In addition, the generation section 222 generates, in accordance with operation information indicating operations by the user and the person in charge from respective of the user terminal 3 and the operator terminal 4 with respect to the avatars, a virtual space image which is output to each of the user terminal 3 and the operator terminal 4.

The updating section 223 updates person-in-charge information stored in the person-in-charge database 6. For example, the updating section 223 updates person-in-charge information based on evaluation information which indicates evaluation by the user with respect to the person in charge.

The output section 224 supplies information to the communication section 21 and outputs information. For example, the output section 224 outputs a virtual space image which has been generated by the generation section 222. Moreover, the output section 224 outputs reason information (hereinafter, referred to as "first reason information") indicating a reason that the selection section 221 has selected the person in charge. Moreover, the output section 224 outputs reason information (hereinafter, referred to as "second reason information"), the second reason information (i) including information that has contributed to the update by the virtual space updating section 12 among pieces of information which have been acquired by the acquisition section 11 and (ii) indicating a reason that the virtual space updating section 12 has changed the virtual space or a state of the virtual space. Details of the reason information will be described later.

(Configuration of User Terminal 3)

As illustrated in FIG. 3, the user terminal 3 includes a communication section 31, a control section 32, a storage section 33, an input section 34, a display section 35, a camera 36, a microphone 37, and a speaker 38.

The communication section 31 is a communication module that communicates with an apparatus which is connected to the user terminal 3 via a network. For example, the communication section 31 outputs information supplied from the control section 32 to the server 2, and supplies information output from the server 2 to the control section 32.

The control section 32 controls constituent elements included in the user terminal 3. For example, the control section 32 acquires information supplied from the input section 34, an image supplied from the camera 36, and sound information supplied from the microphone 37. Moreover, the control section 32 causes the display section 35 to display an image, and causes the speaker 38 to output sound.

The storage section 33 stores data which the control section 32 refers to.

The input section 34 is an interface that receives input of information. For example, the input section 34 is constituted by any of a mouse, a keyboard, a touch pad, and a combination of these which receive operations by the user. As another example, the input section 34 is constituted by a wearable device that measures a heart rate of the user.

The display section 35 is a display device that displays an image. For example, the display section 35 displays a virtual space image which has been output from the control section 32.

The camera 36 is an imaging device that captures an image. For example, the camera 36 supplies an image obtained by imaging a face of the user to the control section 32.

The microphone 37 is a device that collects sound. For example, the microphone 37 collects a voice uttered by the user and voices of a conversation between the user and the person in charge, and supplies a conversation record indicating the voices to the control section 32. As another example, the microphone 37 collects a voice for operating the avatar of the user, and supplies operation information indicating the voice to the control section 32.

The speaker 38 is a device that outputs sound. For example, the speaker 38 outputs a voice of the person in charge which has been supplied from the control section 32.

(Configuration of Operator Terminal 4)

Constituent elements included in the operator terminal 4 are identical with those included in the user terminal 3 described above. Therefore, descriptions of such constituent elements are omitted here.

(Customer Database 5)

The customer database 5 is a database in which information pertaining to a customer (user) is stored. Examples of information stored in the customer database 5 include a name, an age, a gender, information related to a service that is provided (e.g., an account number, or the like in a case where a financial service is provided in a virtual space), a conversation record, and voice of customer (VoC) information, which are attributes of the user. Here, the conversation record may be a conversational voice, or may be text data obtained by transcription of a conversation and natural language processing which are carried out using existing techniques. Hereinafter, the foregoing information stored in the customer database 5 is also referred to as user feature information. The customer database 5 may store virtual space record information of each user. The customer database 5 may store information indicating a record of a position among the position information, information indicating a record of a line-of-sight target among the line-of-sight target information, or information indicating a record of a feeling among the feeling information.

(Person-In-Charge Database 6)

The person-in-charge database 6 is a database in which person-in-charge information pertaining to each of a plurality of candidate persons in charge is stored. Examples of person-in-charge information stored in the person-in-charge database 6 include a name, an age, a gender, information indicating a specialized field in a service provided (e.g., insurance, investment, or the like in a case where a financial service is provided in a virtual space), a score of evaluation by a customer, and performance (e.g., a contract amount, the number of orders, or the like in a case where a financial service is provided in a virtual space). Thus, the person-in-charge information includes one or more pieces of feature information pertaining to the person in charge. The person-in-charge database 6 stores operator availability information indicating an operation status, that is, whether or not the person in charge is currently dealing with a customer.

Example of Displayed Image

Figure 4:
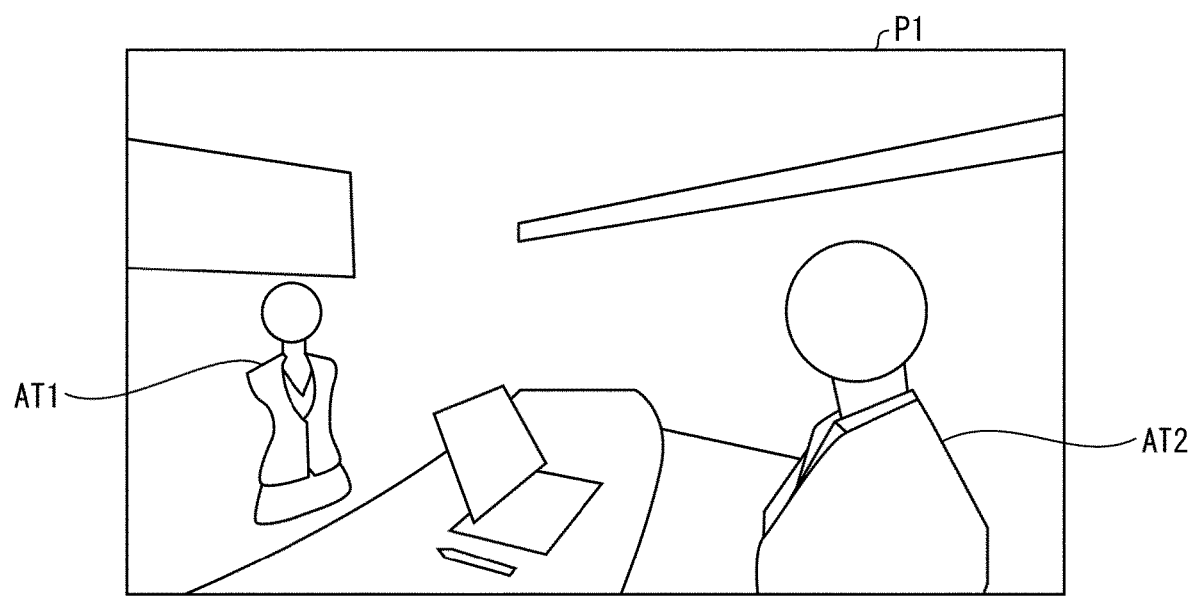
FIG. 4 is a diagram illustrating an example of an image of a virtual space in the information processing system according to the second example embodiment of the present invention.

The following description will discuss an example of a virtual space image generated by the server 2 in the information processing system 100, with reference to FIG. 4. FIG. 4 is a diagram illustrating an example of an image of a virtual space in the information processing system 100 according to the present example embodiment.

An image P1 is an example of an image of a virtual space in which a financial service is provided. As illustrated in the image P1, the virtual space includes an avatar AT1 of a person in charge of providing a service and an avatar AT2 of a user who receives the service. The information processing system 100 may display the image P1 on the display section 35 of the user terminal 3 and on a display section 45 of the operator terminal 4.

The information processing system 100 can be configured to display different images on the display section 35 of the user terminal 3 and on the display section 45 of the operator terminal 4. For example, the display section 35 of the user terminal 3 may display an image which is visible from the avatar AT2 of the user included in the image P1, and the display section 45 of the operator terminal 4 may display an image which is visible from the avatar AT1 of the person in charge included in the image P1.

(Flow of Process S100 in Information Processing System 100)

Figure 5:
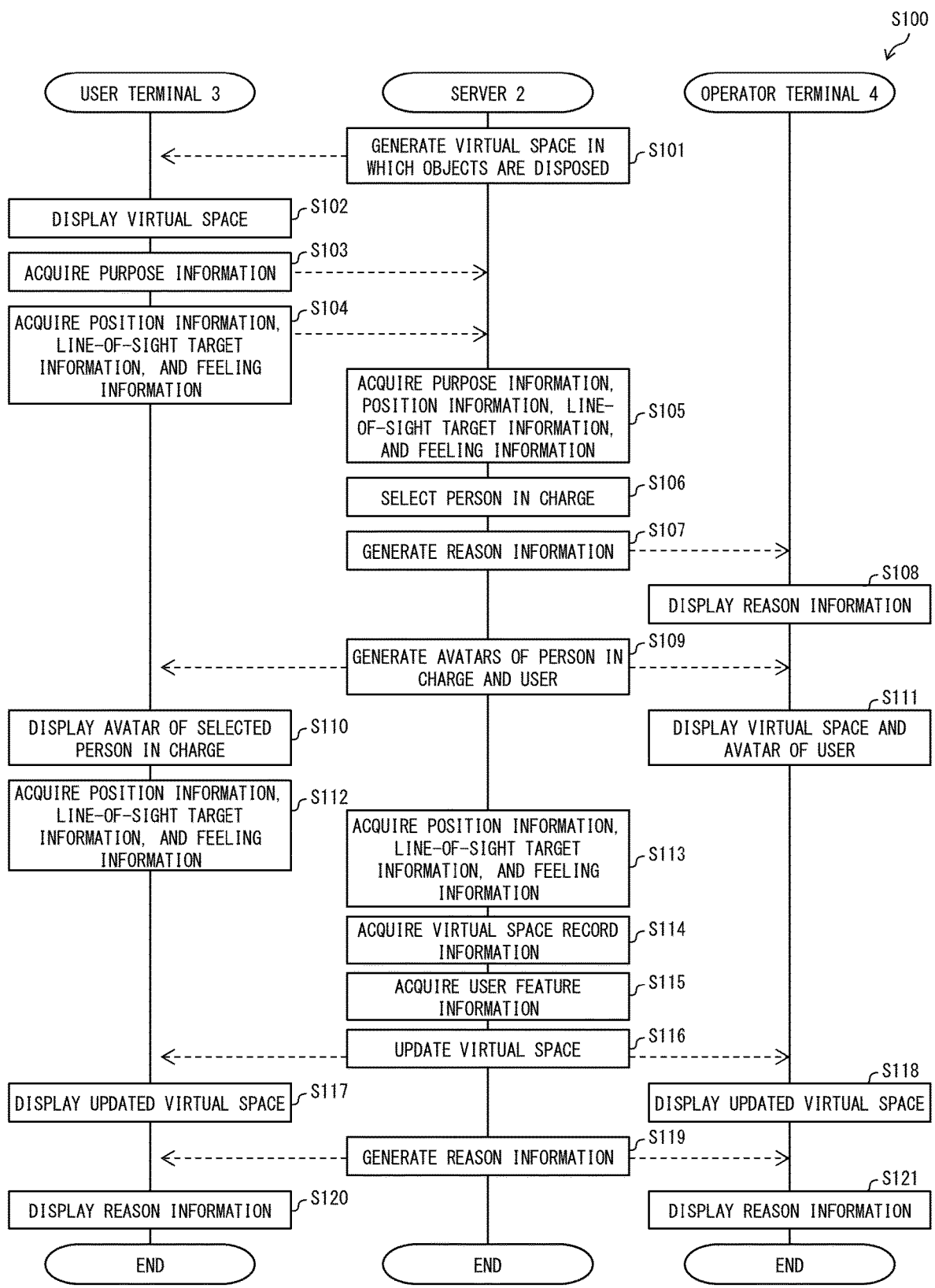
FIG. 5 is a flowchart illustrating a flow of a process in the information processing system according to the second example embodiment of the present invention.

The following description will discuss a flow of a process S100 in the information processing system 100 according to the present example embodiment, with reference to FIG. 5. FIG. 5 is a flowchart illustrating a flow of the process S100 in the information processing system 100 according to the present example embodiment.

(Step S101)

In step S101, the generation section 222 of the server 2 generates a virtual space in which objects are disposed. The generation section 222 supplies the generated virtual space image to the output section 224. The output section 224 outputs, to the user terminal 3, the virtual space image generated by the generation section 222.

(Step S102)

In step S102, the control section 32 of the user terminal 3 acquires the virtual space image which has been output from the server 2. The control section 32 causes the display section 35 to display the acquired virtual space image. As an example of the virtual space image displayed in step S102, the control section 32 may display an image visible from the user when it is assumed that the user is present in the virtual space.

(Step S103)

In step S103, the control section 32 of the user terminal 3 acquires, via the input section 34, purpose information indicating a purpose of the user to use the virtual space. For example, the control section 32 of the user terminal 3 acquires purpose information by outputting information prompting the user to input the purpose information into a reception terminal included as an object in the virtual space. An example of the configuration of outputting information prompting the user to input purpose information includes a configuration in which an image including a selection list is presented so that purpose information is selected. An another example of the configuration of outputting information prompting the user to input purpose information includes a configuration in which an image including an input field is presented so that purpose information is input by text. A still another example of the configuration of outputting information prompting the user to input purpose information includes a configuration in which a voice saying "What can I do for you?" is output. The control section 32 outputs the acquired purpose information to the server 2.

(Step S104)

In step S104, the control section 32 acquires position information and line-of-sight target information.

An example of a method in which the control section 32 acquires position information includes a configuration in which the control section 32 acquires coordinates indicating a position of a user in a world coordinate system of a virtual space. Here, for example, the generation section 222 changes a position and a line-of-sight direction of the user in the world coordinate system of the virtual space based on an operation by the user, and updates a virtual space image which is displayed on the user terminal 3 based on the position and the line-of-sight direction of the user in the virtual space. Then, the control section 32 may acquire, from the generation section 222, the position of the user in the world coordinate system. Note that, in a case where the user terminal 3 is a PC, a tablet, a smart phone, or the like, the operation by the user for changing the position or the line-of-sight direction of the user in the virtual space may be carried out via, for example, a keyboard, a mouse, or a touch pad. In a case where the user terminal 3 is an HMD and a controller, an operation by the user for changing a virtual position may be carried out by an operation of the controller with respect to a movable object disposed in the virtual space. In a case where a gyro sensor or the like is mounted in an HMD, an operation for changing a virtual line of sight may be carried out by changing an orientation of a face together with the worn HMD.

Examples of a method in which the control section 32 acquires line-of-sight target information include a configuration in which the control section 32 identifies a line-of-sight direction in the world coordinate system of the virtual space and identifies a line-of-sight target existing in the line-of-sight direction. For example, as described above, the control section 32 may acquire, from the generation section 222, information indicating a line-of-sight direction in the world coordinate system. Another method can be a configuration in which, in a case where the user terminal 3 is a wearable terminal such as an HMD, the control section 32 identifies a line-of-sight target using a gyro sensor of the wearable terminal. Alternatively, a configuration may be employed in which the control section 32 identifies a line-of-sight target included in the center of the virtual space image which is displayed on the display apparatus of the user terminal 3, without identifying a line-of-sight direction in the world coordinate system.

In step S104, the control section 32 may further acquire feeling information including a feeling of the user or a record of the feeling.

Examples of a method in which the control section 32 acquires feeling information include a configuration in which a feeling of the user is identified by analyzing a physiological index of the user acquired via the input section 34, a facial expression of the user acquired via the camera 36, a voice acquired via the microphone 37, and content of text input into the input section 34. Examples of the physiological index of the user include pulse waves, brain waves, a heart rate, and perspiration. In a case where the user terminal 3 is an HMD, it is possible to employ a configuration in which the HMD detects a facial expression around a mouth of the user and identifies a feeling of the user.

The control section 32 outputs the acquired position information, line-of-sight target information, and feeling information to the server 2.

(Step S105)

In step S105, the acquisition section 11 of the server 2 acquires purpose information, position information, line-of-sight target information, and feeling information which have been output from the user terminal 3. The acquisition section 11 causes the storage section 23 to store the acquired purpose information, position information, line-of-sight target information, and feeling information.

Here, the acquisition section 11 may acquire both of or any one of (i) feeling information indicating a record of a feeling of the user and (ii) feeling information indicating a current feeling of the user.

(Step S106)

In step S106, the selection section 221 selects, based on position information and line-of-sight target information stored in the storage section 23, a person in charge of dealing with the user in the virtual space from among persons in charge indicated by person-in-charge information that is stored in the person-in-charge database 6.

The selection section 221 may select a person in charge with further reference to feeling information stored in the storage section 23. As an example, the following description will discuss a case where feeling information indicates that a feeling of the user is anger. In addition, it is assumed that a skill of claim handling is defined as a skill of the person in charge of dealing with a feeling of anger. In this case, the selection section 221 selects a person in charge who is specialized in dealing with claims from among a plurality of persons in charge who have been selected with reference to the position information and the line-of-sight target information.

(Step S107)

In step S107, the selection section 221 generates reason information (first reason information) indicating a reason that the person in charge has been selected in step S106. The selection section 221 supplies the generated first reason information to the output section 224. The output section 224 outputs, to the operator terminal 4, the first reason information which has been supplied from the selection section 221.

(Step S108)

In step S108, the control section 42 of the operator terminal 4 acquires first reason information which has been output from the server 2. The control section 42 causes the display section 45 to display the acquired first reason information.

As an example of the processes in step S107 and step S108, in a case where a person in charge is selected for a reason that the person in charge is specialized in the product A, the selection section 221 generates, in step S107, first reason information including information "specialized in product A" which is included in the person-in-charge information. The selection section 221 supplies the generated first reason information to the output section 224. The output section 224 outputs, to the operator terminal 4, the first reason information which has been supplied from the selection section 221. For example, the display section 45 of the operator terminal 4 displays an image including text "You are assigned as the person in charge because you are specialized in the product A".

(Step S109)

In step S109, the generation section 222 of the server 2 generates avatars of a person in charge who has been selected by the selection section 221 and the user. The avatar of the person in charge may be stored in advance in the person-in-charge database 6 in association with the person in charge. Alternatively, the avatar of the person in charge may be an avatar that is not related to the selected person in charge. For example, even in a case where the gender of the selected person in charge is male, the generation section 222 may generate a female avatar as an avatar of the person in charge.

The avatar of the user may be generated with reference to an image which has been captured by a camera of the user terminal and includes the user as a subject. Alternatively, the avatar of the user may be generated with reference to user information (such as age and gender) which has been acquired together with purpose information in the foregoing step S103.

The generation section 222 supplies the generated avatars to the output section 224. The output section 224 outputs, to the user terminal 3, the avatar of the person in charge among the avatars supplied from the generation section 222, and outputs, to the operator terminal 4, the avatar of the user and the virtual space image generated in step S101.

(Step S110)

In step S110, the control section 32 of the user terminal 3 acquires the avatar of the person in charge which has been output from the server 2. The control section 32 disposes and displays the acquired avatar in the virtual space displayed in step S102.

(Step S111)

In step S111, the control section 42 of the operator terminal 4 acquires the avatar of the user and the virtual space image which have been output from the server 2. The control section 42 disposes and displays the acquired avatar in the acquired virtual space.

(Step S112)

In step S112, the control section 32 of the user terminal 3 acquires position information, line-of-sight target information, and feeling information. The method in which the control section 32 acquires position information, line-of-sight target information, and feeling information is as described in step S104. Note, however, that the process of step S104 is carried out before a person in charge of dealing with the user is selected, whereas the process of this step is carried out after the person in charge is selected. For example, the process of this step may be carried out before the person in charge starts dealing with the user or after the person in charge starts dealing with the user. The control section 32 outputs the acquired position information, line-of-sight target information, and feeling information to the server 2.

(Step S113)

In step S113, the acquisition section 11 of the server 2 acquires position information, line-of-sight target information, and feeling information which have been output from the user terminal 3. That is, the control section 32 acquires position information, line-of-sight target information, and feeling information pertaining to the user after the person in charge has been selected. The acquisition section 11 causes the storage section 23 to store the acquired position information, line-of-sight target information, and feeling information.

(Step S114)

In step S114, the acquisition section 11 acquires virtual space record information from the customer database 5. The acquisition section 11 causes the storage section 23 to store the acquired virtual space record information.

(Step S115)

In step S115, the acquisition section 11 acquires user feature information from the customer database 5. The acquisition section 11 causes the storage section 23 to store the acquired user feature information.

(Step S116)

In step S116, the virtual space updating section 12 updates, based on position information, feeling information, and virtual space record information which are stored in the storage section 23, the virtual space which is being used by the user. An example of the process in which the virtual space updating section 12 updates the virtual space will be described later. The virtual space updating section 12 supplies the updated virtual space to the output section 224. The output section 224 outputs, to the user terminal 3 and the operator terminal 4, the virtual space which has been updated by the virtual space updating section 12.

In a case where the process of step S112 is carried out after the person in charge has started dealing with the user, the virtual space updating section 12 changes the virtual space which is being used by the user or a state of the virtual space based on information which has been acquired while the person in charge is dealing with the user. With this configuration, the virtual space updating section 12 updates the virtual space based on position information, feeling information, and virtual space record information of the user while the person in charge is dealing with the user. Therefore, it is possible to update the virtual space in real time according to the state of the user who is being dealt with by the person in charge.

(Step S117)

In step S117, the control section 32 of the user terminal 3 acquires the updated virtual space which has been output from the server 2. The control section 32 causes the display section 35 to display an image indicating the updated virtual space. Here, the control section 32 may dispose and display the avatar acquired in step S110 in the updated virtual space.

(Step S118)

In step S118, the control section 42 of the operator terminal 4 acquires the updated virtual space which has been output from the server 2. The control section 42 causes the display section 45 to display an image indicating the updated virtual space. Here, the control section 42 may dispose and display the avatar acquired in step S111 in the updated virtual space.

(Step S119)

In step S119, the virtual space updating section 12 of the server 2 generates reason information (second reason information) which (i) includes information that has contributed to the update by the virtual space updating section 12 in step S116, and (ii) indicates a reason that the virtual space updating section 12 has updated the virtual space. The virtual space updating section 12 supplies the generated second reason information to the output section 224. The output section 224 outputs, to the user terminal 3 and the operator terminal 4, the second reason information which has been generated by the virtual space updating section 12. An example of the process in which the virtual space updating section 12 generates second reason information will be described later.

(Step S120)

In step S120, the control section 32 of the user terminal 3 acquires second reason information which has been output from the server 2. The control section 32 causes the display section 35 to display the acquired second reason information.

(Step S121)

In step S121, the control section 42 of the operator terminal 4 acquires second reason information which has been output from the server 2. The control section 42 causes the display section 45 to display the acquired second reason information.

Example 1 of Process Carried Out by Virtual Space Updating Section 12

The following description will discuss an example of a process which is carried out by the virtual space updating section 12.

In this example, a process will be described in which the virtual space updating section 12 updates, based on position information, feeling information, and virtual space record information which have been acquired by the acquisition section 11 in step S113 described above, a virtual space which is being used by the user. In this example, the position information indicates that the user has been positioned in a narrow place. The feeling information indicates that a feeling of the user has been a negative feeling (e.g., anxiety). The virtual space record information indicates that the user has used a virtual space of grassland.

In this specific example, the virtual space updating section 12 determines that a larger virtual space is suitable for the user based on the fact that the user has had the negative feeling in the narrow place. Moreover, the virtual space updating section 12 selects, as the "larger virtual space", a virtual space of grassland which has been used by the user in the past. As such, the virtual space updating section 12 updates the virtual space which is being used by the user to the virtual space of grassland. Thus, the virtual space updating section 12 may decide a condition of a virtual space which is to be changed based on position information and feeling information, and may select, based on virtual space record information, a virtual space which satisfies the decided condition.

Example 2 of Process Carried Out by Virtual Space Updating Section 12

The virtual space updating section 12 may be configured to update a virtual space, which is being used by the user, based on virtual space record information indicating a record of a virtual space which has been used by a plurality of users. Here, the plurality of users may or may not include the user. In this example, the position information indicates that the user has been positioned in a narrow place. Moreover, the feeling information indicates that a feeling of the user has been a negative feeling (e.g., anxiety).

In this specific example, the virtual space updating section 12 determines that a larger virtual space is suitable for the user based on the fact that the user has had the negative feeling in the narrow place. Moreover, the virtual space updating section 12 changes the virtual space which is being used by the user to a virtual space that is a larger virtual space and that has been used most frequently, which is indicated by the virtual space record information. In other words, the virtual space updating section 12 may be configured to refer to statistical data of a virtual space which has been used by a plurality of users. Note that the statistical data is not limited to the data indicating the fact of being "used most frequently", and can be statistical data based on the "frequency of use", such as "the frequency of use is any value that is not lower than a threshold", and "the frequency of use is any rank up to a predetermined rank". The statistical data is not limited to the statistical data based on the "frequency of use", and may be, for example, data based on a "rate of increase in use" or the like. With this configuration, the virtual space updating section 12 can provide, by referring to virtual space record information which has been used by a plurality of users that do not include a user of interest, a suitable virtual space even for the user of interest who uses a virtual space for the first time.

Example 3 of Process Carried Out by Virtual Space Updating Section 12

In the foregoing step S110, the virtual space updating section 12 may update an avatar displayed on a virtual space. In other words, a virtual space which is being used by the user includes an avatar of a person in charge of dealing with the user, and the virtual space updating section 12 may update the avatar.

The following description will discuss an example in which an avatar of a person in charge included in a virtual space which is being used by the user is male. In this example, position information indicates that the user is positioned near the person in charge. Moreover, feeling information indicates that a feeling of the user has been a negative feeling (e.g., anxiety). Moreover, virtual space record information indicates that the user used a female avatar.

In this case, the virtual space updating section 12 decides, based on the fact that the user has a negative feeling near the male avatar, to change the avatar to an avatar which is not male. Moreover, the virtual space updating section 12 decides, as a changed avatar, a female avatar which has been used by the user in the past. As such, the virtual space updating section 12 updates the avatar of the person in charge included in the virtual space which is being used by the user to a female avatar. Thus, the virtual space updating section 12 may decides a condition of an avatar which is to be changed based on position information, feeling information, and virtual space record information, and may select, based on virtual space record information, an avatar which satisfies the decided condition.

With this configuration, in regard to an avatar of a person in charge included in a virtual space, the virtual space updating section 12 can provide an avatar more suitable to the user.

Example 4 of Process Carried Out by Virtual Space Updating Section 12

The following description will discuss a case where the virtual space updating section 12 changes a state of a virtual space which is being used by the user. The virtual space updating section 12 can be configured to update, as a state of a virtual space, an element included in the virtual space, or can be configured to change, as a state of a virtual space, a setting of the virtual space itself. For example, the virtual space updating section 12 may be configured to change the virtual space by changing a lighting environment in the virtual space which is being used by the user, changing a color tone in the virtual space, changing a shape or a size of the virtual space, changing a virtual object included in the virtual space, or changing the virtual space to another virtual space.

The following description will discuss an example of changing the lighting environment. In this example, the position information indicates that the user has been positioned near an entrance. Moreover, feeling information indicates a feeling of uncertainty. Moreover, virtual space record information includes information indicating a purchase amount of the user or another user in association with a virtual space which has been used by the user or another user. In this case, the virtual space updating section 12 decides a condition of making the lighting environment brighter based on the fact that the user has been feeling uncertainty near the entrance. The virtual space updating section 12 identifies, based on the virtual space record information, a lighting environment for which a purchase amount has been greatest among lighting environments that satisfy the decided condition. Then, the virtual space updating section 12 updates the lighting environment in the virtual space which is being used by the user to the identified lighting environment.

It is possible to describe examples in which the virtual space updating section 12 changes a color tone in the virtual space and changes a shape or a size of the virtual space by, in the example of changing the lighting environment, replacing the "lighting environment" with a "color tone" of the virtual space or replacing the "lighting environment" with a "shape or size" of the virtual space.

As another example, the following description will discuss an example of changing a virtual object. In this example, the position information indicates that the user has been positioned near a poster of a product A. Moreover, feeling information indicates a feeling of interest. Moreover, virtual space record information includes information indicating whether or not the product A has been purchased by the user or another user, in association with a virtual space which has been used by the user or another user. In this case, the virtual space updating section 12 decides to change the poster to detailed content pertaining to the product A based on the fact that the user has had the feeling of interest near the poster of the product A. Moreover, the virtual space updating section 12 identifies, based on the virtual space record information, a poster whose number is greatest among posters that have detailed content into which the current poster is to be changed and that are disposed in a virtual space(s) in which the product A has been purchased. Then, the virtual space updating section 12 changes the poster that pertains to the product A and that is disposed in the virtual space, which is being used by the user, into a poster having the identified content.

With this configuration, the virtual space updating section 12 can provide a virtual space suitable for the user. Therefore, it is possible to improve a degree of satisfaction of the user. Furthermore, with this configuration, it is possible to improve the degree of satisfaction of the user, and this makes it possible to provide a suitable virtual space even for a side that provides a service using the virtual space.

Example 5 of Process Carried Out by Virtual Space Updating Section 12

The virtual space updating section 12 may be configured to update a virtual space, which is being used by the user, based further on line-of-sight target information which has been acquired by the acquisition section 11 in step S113.

For example, position information indicates that the user has been positioned near a poster of a product A. Moreover, feeling information indicates a feeling of interest. Moreover, virtual space record information includes information indicating whether or not the product A has been purchased by the user or another user, in association with a virtual space which has been used by the user or another user. Moreover, the line-of-sight target information indicates that the user has been looking at a notice about the product A. In this case, the virtual space updating section 12 decides virtual spaces each including the poster of the product A as an object based on the fact that the user has had a feeling of interest near the poster of the product A and that the user has been looking at the poster of the product A. Moreover, the virtual space updating section 12 identifies, based on the virtual space record information, a virtual space in which the product A has been purchased among the decided virtual spaces. Then, the virtual space updating section 12 changes the virtual space which is being used by the user into the identified virtual space.

With this configuration, the virtual space updating section 12 can update the virtual space which is being used by the user to a virtual space including an object in which the user is interested. Therefore, it is possible to provide a virtual space which is more suitable for the user.

Example 6 of Process Carried Out by Virtual Space Updating Section 12

The virtual space updating section 12 may be configured to update a virtual space, which is being used by the user, based further on user feature information which has been acquired by the acquisition section 11 in step S115.

For example, position information indicates that the user has been positioned near a poster of a product A. Moreover, feeling information indicates a feeling of interest. Moreover, virtual space record information includes information indicating whether or not the product A has been purchased by the user or another user, in association with a virtual space which has been used by the user or another user. Moreover, the user feature information indicates that articles which have been purchased so far by the user are expensive. In this case, the virtual space updating section 12 decides virtual spaces each including the poster of the product A as an object based on the fact that the user has had a feeling of interest near the poster of the product A. Moreover, the virtual space updating section 12 identifies, based on the virtual space record information, a virtual space in which the product A has been purchased among the decided virtual spaces. Moreover, the virtual space updating section 12 changes the object included in the decided virtual space into a luxurious object.

With this configuration, the virtual space updating section 12 can update the virtual space, which is being used by the user, to a virtual space corresponding to the feature of the user. Therefore, it is possible to provide a virtual space which is more suitable for the user.

Example 7 of Process Carried Out by Virtual Space Updating Section 12

The virtual space updating section 12 generates, in step S119 described above, second reason information which includes information that has contributed to an update and which indicates a reason that a virtual space has been updated.

For example, position information indicates that the user has been positioned in a narrow place. Moreover, feeling information indicates that a feeling of the user has been a negative feeling (e.g., anxiety). Moreover, virtual space record information indicates that the user used a virtual space of grassland. In this case, it is determined that a larger virtual space is suitable for the user based on the fact that the user has had the negative feeling in the narrow place. Moreover, the virtual space updating section 12 selects, as the "larger virtual space", a virtual space of grassland which has been used by the user in the past.

Then, the virtual space updating section 12 generates second reason information including position information, feeling information, and virtual space record information which have contributed to the update. The virtual space updating section 12 supplies the generated second reason information to the output section 224. The output section 224 outputs, to the user terminal 3 and the operator terminal 4, the second reason information which has been generated by the virtual space updating section 12.

For example, the display section 35 of the user terminal 3 and the display section 45 of the operator terminal 4 display an image including text "The customer feels like being in a large place, and often uses a large place, so the place has been changed to a large place."

Here, the output section 224 may be configured to output the second reason information to any one of the user terminal 3 and the operator terminal 4.

With this configuration, the virtual space updating section 12 can notify at least one of the person in charge and the user of the reason that the virtual space has been updated.

Thus, in the information processing system 100 according to the present example embodiment, the server 2 updates a virtual space, which is being used by the user, based on various kinds of information, in addition to position information, feeling information, and virtual space record information. Therefore, in the information processing system 100 according to the present example embodiment, the server 2 can provide a virtual space which is more suitable for the user.

Third Example Embodiment

The following description will discuss a third example embodiment of the present invention in detail with reference to the drawings. The same reference numerals are given to constituent elements which have functions identical with those described in the foregoing example embodiments, and descriptions as to such constituent elements are omitted as appropriate.

(Configuration of Information Processing System 100A)

Figure 6:
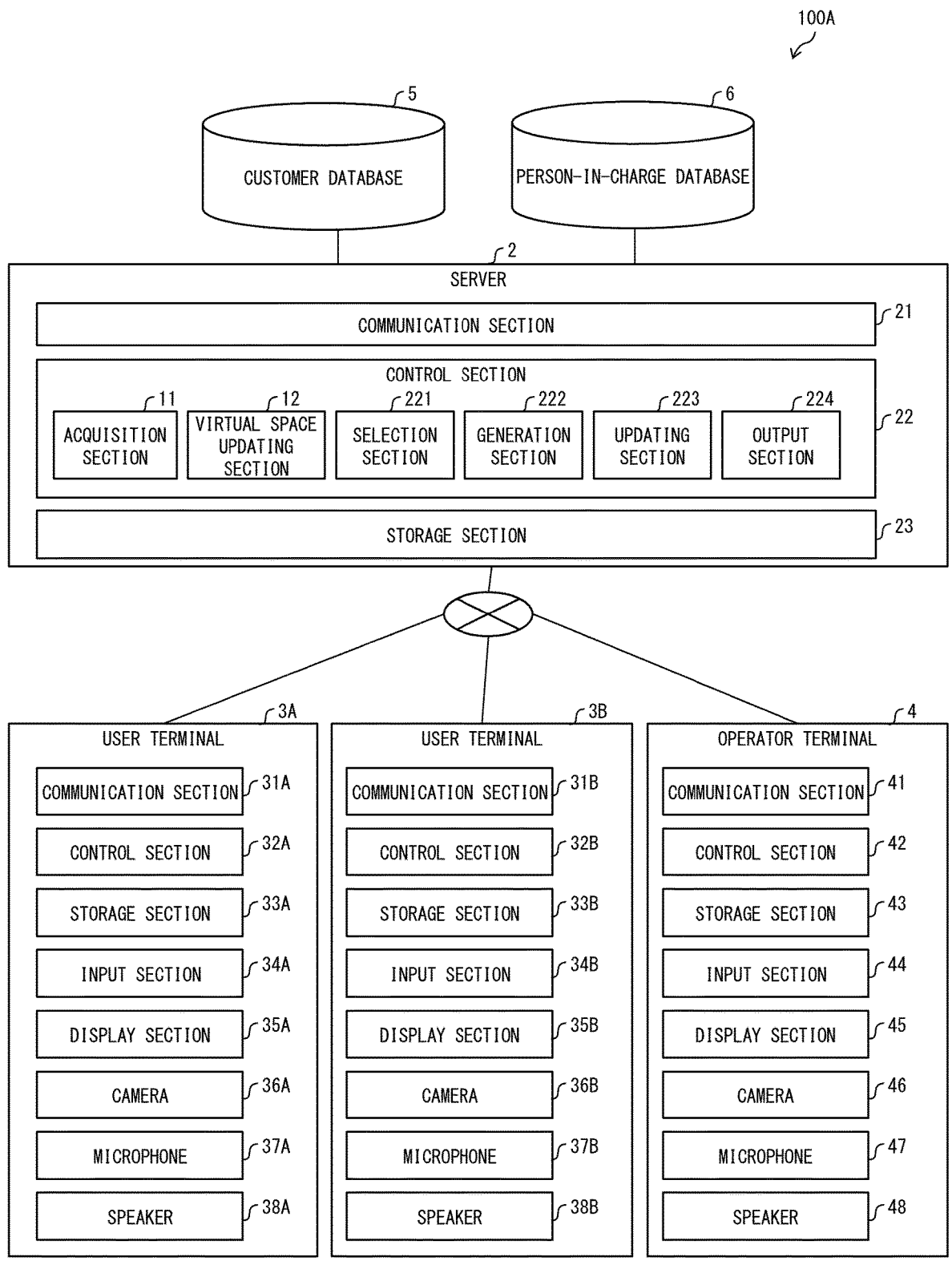
FIG. 6 is a block diagram illustrating a configuration of an information processing system according to a third example embodiment of the present invention.

The following description will discuss a configuration of the information processing system 100A according to the present example embodiment, with reference to FIG. 6. FIG. 6 is a block diagram illustrating the configuration of the information processing system 100A according to the present example embodiment.

As illustrated in FIG. 6, the information processing system 100A is configured to include a server 2, a plurality of user terminals 3 (user terminal 3A and user terminal 3B), an operator terminal 4, a customer database 5, and a person-in-charge database 6. The server 2 and the user terminal 3 are each configured to realize the virtual space changing apparatus in the present example embodiment.

In the information processing system 100A, the server 2 has, in addition to the functions of the server 2 in the information processing system 100 described above, a function to provide a virtual space which is shared by the user terminal 3A and the user terminal 3B. Hereinafter, a user who uses the user terminal 3A is referred to as a first user, and a user who uses the user terminal 3B is referred to as a second user. The server 2 updates, for each of the first user and the second user, the shared virtual space based on position information, feeling information, and virtual space record information.

(Configuration of Server 2)

As illustrated in FIG. 6, the server 2 includes a communication section 21, a control section 22, and a storage section 23. The communication section 21 and the storage section 23 are as described above.

The control section 22 controls constituent elements included in the server 2. As illustrated in FIG. 6, the control section 22 functions also as an acquisition section 11, a virtual space updating section 12, a selection section 221, a generation section 222, an updating section 223, and an output section 224. The acquisition section 11, the virtual space updating section 12, and the output section 224 are configured to realize the acquisition means, the virtual space changing means, and the output means in the present example embodiment.

The acquisition section 11 acquires information supplied from the communication section 21. For example, the acquisition section 11 acquires position information, feeling information, and virtual space record information. The position information which is acquired includes positions of the first user and the second user in the virtual space or records of the positions. The feeling information which is acquired includes feelings of the first user and the second user or records of the feelings. The virtual space record information which is acquired includes a record of a virtual space which has been used by at least one of the first user, the second user, and another user. The acquisition section 11 causes the storage section 23 to store the acquired pieces of information.

The virtual space updating section 12 updates a virtual space which is being used by the user. For example, the virtual space updating section 12 updates the virtual space, which is being used by the first user and the second user, based on position information, feeling information, and virtual space record information which are stored in the storage section 23. Details of the process in which the virtual space updating section 12 updates the virtual space will be described later.

The selection section 221 selects a person in charge of dealing with the user in the virtual space. For example, the selection section 221 selects, based on position information and line-of-sight target information stored in the storage section 23, a person in charge of dealing with the first user and the second user in the virtual space from among persons in charge indicated by person-in-charge information that is stored in the person-in-charge database 6.

The generation section 222 generates a virtual space. Moreover, the generation section 222 disposes an object in the generated virtual space. Examples of the object include a notice pertaining to a service that is provided in the virtual space. Furthermore, the generation section 222 generates (i) an avatar of the first user which acts in accordance with an operation by the first user of the user terminal 3A and (ii) an avatar of the second user which acts in accordance with an operation by the second user of the user terminal 3B. Furthermore, the generation section 222 generates an avatar of a person in charge which acts in accordance with an operation by the person in charge who is the user of the operator terminal 4 and who has been selected by the selection section 221.

Moreover, the generation section 222 generates a virtual space image which is output to each of the user terminal 3A, the user terminal 3B, and the operator terminal 4, in accordance with operation information indicating operations with respect to the avatars by the first user, the second user, and the person in charge from respective of the user terminal 3A, the user terminal 3B, and the operator terminal 4.

The updating section 223 updates person-in-charge information stored in the person-in-charge database 6. For example, the updating section 223 updates person-in-charge information based on evaluation information which indicates evaluation by the first user and the second user with respect to the person in charge.

The output section 224 supplies information to the communication section 21 and outputs information. For example, the output section 224 outputs a virtual space image which has been generated by the generation section 222. Moreover, the output section 224 outputs first reason information indicating a reason that the selection section 221 has selected the person in charge. Moreover, the output section 224 outputs second reason information (i) including information that has contributed to the update by the virtual space updating section 12 among pieces of information which have been acquired by the acquisition section 11 and (ii) indicating a reason that the virtual space updating section 12 has updated the virtual space. Details of the reason information will be described later.

(Configurations of User Terminal 3A and User Terminal 3B)

Constituent elements included in each of the user terminal 3A and the user terminal 3B are identical with those included in the user terminal 3 in the foregoing example embodiments. Therefore, descriptions of such constituent elements are omitted here.

(Configuration of Operator Terminal 4)

Constituent elements included in the operator terminal 4 are identical with those included in the user terminal 3 described in the foregoing example embodiments. Therefore, descriptions of such constituent elements are omitted here.

(Flow of Process S100A in Information Processing System 100A)

Figure 7:
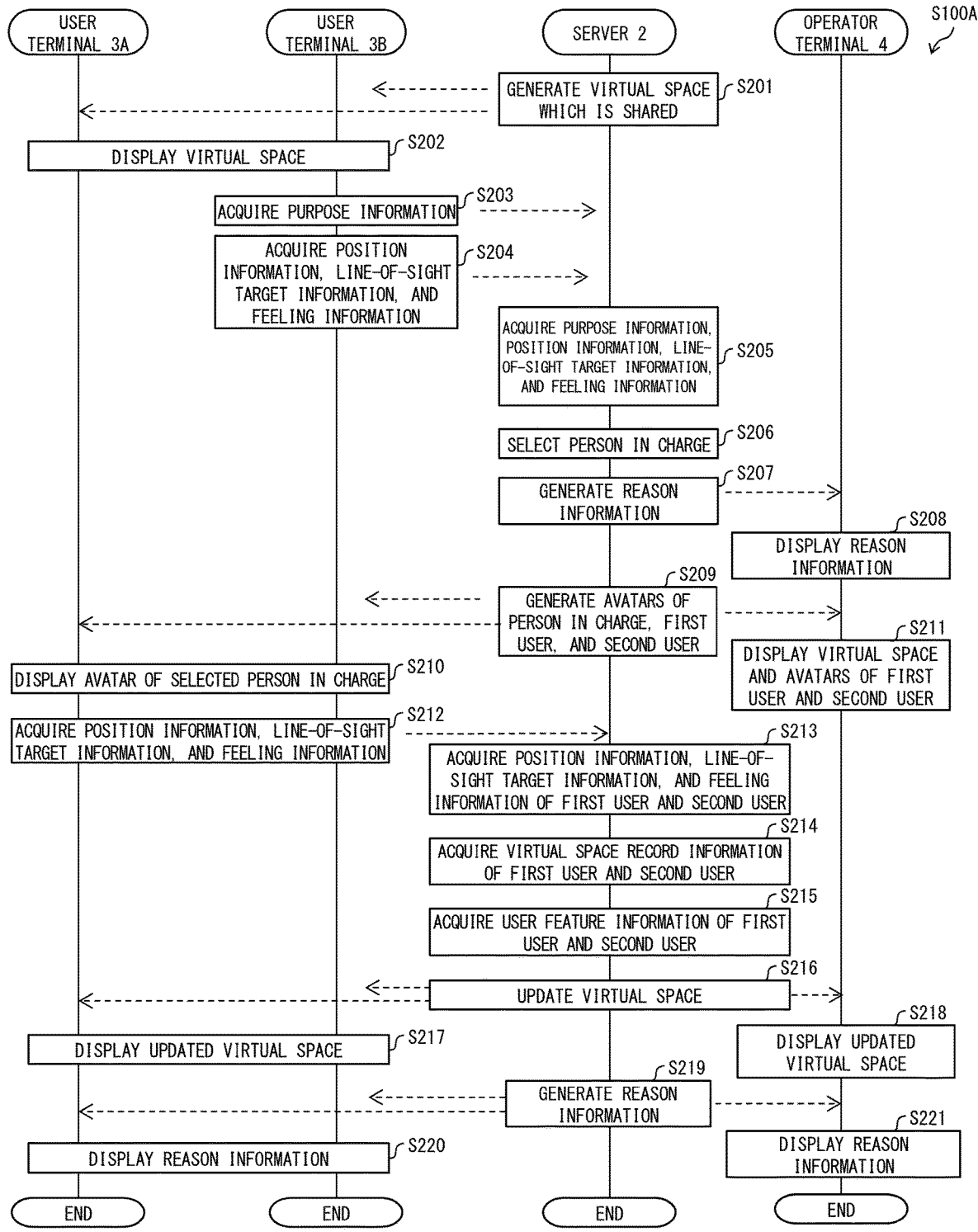
FIG. 7 is a flowchart illustrating a flow of a process in the information processing system according to the third example embodiment of the present invention.

The following description will discuss a flow of a process S100A in the information processing system 100A according to the present example embodiment, with reference to FIG. 7. FIG. 7 is a flowchart illustrating a flow of a process S100A in the information processing system 100A according to the present example embodiment.

(Step S201)

In step S201, the generation section 222 of the server 2 generates a virtual space in which objects are disposed and which is shared by the first user and the second user. The generation section 222 supplies the generated virtual space image to the output section 224. The output section 224 outputs, to the user terminal 3A and the user terminal 3B, the virtual space image generated by the generation section 222.

(Step S202)

In step S202, the control section 32A of the user terminal 3A acquires the virtual space image which has been output from the server 2. The control section 32A causes the display section 35A to display the acquired virtual space image.

Moreover, in step S202, the control section 32B of the user terminal 3B acquires the virtual space image which has been output from the server 2. The control section 32B causes the display section 35B to display the acquired virtual space image.

(Step S203)

In step S203, the control section 32B of the user terminal 3B acquires, via the input section 34B, purpose information indicating a purpose of the first user and the second user to use the virtual space. Note that the process of step S203 may be carried out by the control section 32A of the user terminal 3A, instead of the control section 32B.

(Step S204)

In step S204, the control section 32B acquires position information, line-of-sight target information, and feeling information. Note that the process of step S204 may be carried out by the control section 32A of the user terminal 3A instead of the control section 32B or in addition to the control section 32B.

(Step S205)

In step S205, the acquisition section 11 of the server 2 acquires purpose information, position information, line-of-sight target information, and feeling information which have been output from the user terminal 3B. The acquisition section 11 causes the storage section 23 to store the acquired purpose information, position information, line-of-sight target information, and feeling information.

(Step S206)

In step S206, the selection section 221 selects, based on position information and line-of-sight target information stored in the storage section 23, a person in charge of dealing with the user in the virtual space from among persons in charge indicated by person-in-charge information that is stored in the person-in-charge database 6.

(Step S207)

In step S207, the selection section 221 generates first reason information indicating a reason that the person in charge has been selected in step S206. The selection section 221 supplies the generated first reason information to the output section 224. The output section 224 outputs, to the operator terminal 4, the first reason information which has been supplied from the selection section 221.

(Step S208)

In step S208, the control section 42 of the operator terminal 4 acquires the first reason information which has been output from the server 2. The control section 42 causes the display section 45 to display the acquired first reason information.

(Step S209)

In step S209, the generation section 222 of the server 2 generates avatars of the person in charge who has been selected by the selection section 221, the first user, and the second user. The generation section 222 supplies the generated avatars to the output section 224. The output section 224 outputs, to the user terminal 3A and the user terminal 3B, the avatar of the person in charge among the avatars supplied from the generation section 222. The output section 224 outputs, to the operator terminal 4, the avatar of the first user, the avatar of the second user, and the virtual space image generated in step S101.

(Step S210)

In step S210, the control section 32A of the user terminal 3A acquires the avatar of the person in charge which has been output from the server 2. The control section 32A disposes and displays the acquired avatar in the virtual space displayed in step S102.

Moreover, in step S210, the control section 32B of the user terminal 3B acquires the avatar of the person in charge which has been output from the server 2. The control section 32B disposes and displays the acquired avatar in the virtual space displayed in step S102.

(Step S211)

In step S211, the control section 42 of the operator terminal 4 acquires the avatar of the first user, the avatar of the second user, and the virtual space image which have been output from the server 2. The control section 42 disposes and displays the acquired avatar of the first user and the acquired avatar of the second user in the acquired virtual space.

(Step S212)

In step S212, the control section 32A of the user terminal 3A acquires position information, line-of-sight target information, and feeling information. The control section 32A outputs the acquired position information, line-of-sight target information, and feeling information to the server 2.

Moreover, in step S212, the control section 32B of the user terminal 3B acquires position information, line-of-sight target information, and feeling information. The control section 32B outputs the acquired position information, line-of-sight target information, and feeling information to the server 2.

(Step S213)

In step S213, the acquisition section 11 of the server 2 acquires, for each of the first user and the second user who share the virtual space, position information, line-of-sight target information, and feeling information which have been output from each of the user terminal 3A and the user terminal 3B. The acquisition section 11 causes the storage section 23 to store the acquired position information, line-of-sight target information, and feeling information.

(Step S214)

In step S214, the acquisition section 11 acquires virtual space record information of each of the first user and the second user from the customer database 5. The acquisition section 11 causes the storage section 23 to store the acquired virtual space record information.

(Step S215)

In step S215, the acquisition section 11 acquires user feature information of each of the first user and the second user from the customer database 5. The acquisition section 11 causes the storage section 23 to store the acquired user feature information.

(Step S216)

In step S216, the virtual space updating section 12 changes, based on information acquired by the acquisition section 11, the virtual space which is shared by the first user and the second user, or a state of the shared virtual space, for each of the first user and the second user. The virtual space updating section 12 supplies the updated virtual space to the output section 224. The output section 224 outputs, to the user terminal 3A, the user terminal 3B, and the operator terminal 4, the virtual space which has been updated by the virtual space updating section 12.

As an example of the process in which the virtual space updating section 12 updates the virtual space, a fact is identified, based on information acquired by the acquisition section 11 for the first user, that the first user had a negative feeling when the first user was positioned in a narrow place, and the first user used a large place in the past. Moreover, based on information acquired by the acquisition section 11 for the second user, a fact is identified that the second user had a negative feeling with respect to a male avatar included in the virtual space, and the second user used a female avatar in the past.

In this case, the virtual space updating section 12 updates the virtual space which is being shared and used by the first user and the second user to a larger virtual space in which a female avatar is disposed as an avatar of the person in charge.

Note that, similarly to the foregoing example embodiments, the virtual space updating section 12 may update the virtual space based on (i) virtual space record information indicating a record of a virtual space which has been used by at least one of the first user, the second user, and another user, (ii) line-of-sight target information of each of the first user and the second user, and (iii) feature information of each of the first user and the second user. The virtual space updating section 12 may update the virtual space by changing a lighting environment in the virtual space which is being used by the first user and the second user, changing a color tone in the virtual space, changing a shape or size of the virtual space, changing a virtual object included in the virtual space, or changing the virtual space to another virtual space.

(Step S217)

In step S217, the control section 32A of the user terminal 3A acquires the updated virtual space which has been output from the server 2. The control section 32A causes the display section 35A to display the updated virtual space.

Moreover, in step S217, the control section 32B of the user terminal 3B acquires the updated virtual space which has been output from the server 2. The control section 32B causes the display section 35B to display the updated virtual space.
(Step S218)

In step S218, the control section 42 of the operator terminal 4 acquires the updated virtual space which has been output from the server 2. The control section 42 causes the display section 45 to display the updated virtual space.
(Step S219)

In step S219, the virtual space updating section 12 of the server 2 generates second reason information which (i) includes information that has contributed to the update by the virtual space updating section 12 in step S216, and (ii) indicates a reason that the virtual space updating section 12 has updated the virtual space. The virtual space updating section 12 supplies the generated second reason information to the output section 224. The output section 224 outputs, to the user terminal 3A, the user terminal 3B, and the operator terminal 4, the second reason information generated by the virtual space updating section 12.
(Step S220)

In step S220, the control section 32A of the user terminal 3A acquires second reason information which has been output from the server 2. The control section 32A causes the display section 35A to display the acquired second reason information.

Moreover, in step S220, the control section 32B of the user terminal 3B acquires second reason information which has been output from the server 2. The control section 32B causes the display section 35B to display the acquired second reason information.
(Step S221)

In step S221, the control section 42 of the operator terminal 4 acquires second reason information which has been output from the server 2. The control section 42 causes the display section 45 to display the acquired second reason information.

Thus, in the information processing system 100A according to the present example embodiment, the server 2 acquires position information, feeling information, and virtual space record information for each of the first user and the second user who share the virtual space. Moreover, the server 2 updates, based on the acquired position information, feeling information, and virtual space record information, the virtual space which is shared by the first user and the second user. Therefore, in the information processing system 100A according to the present example embodiment, even in a case where there are a plurality of users, the server 2 can provide a virtual space suitable for the plurality of users.

Fourth Example Embodiment

The following description will discuss a fourth example embodiment of the present invention in detail with reference to the drawings. The same reference numerals are given to constituent elements which have functions identical with those described in the foregoing example embodiments, and descriptions as to such constituent elements are omitted as appropriate.
(Configuration of Information Processing System 100A)

A configuration of the information processing system 100A according to the present example embodiment is identical with that of the information processing system 100A in the third example embodiment. Therefore, descriptions of such a configuration are omitted here.

In the information processing system 100A according to the present example embodiment, the server 2 has, in addition to the functions of the server 2 in the information processing system 100A described above, a function to provide a virtual space which is shared by the user terminal 3A and the user terminal 3B. Then, the server 2 outputs, to the user terminal 3A, a virtual space which reflects a first update with respect to the shared virtual space, and outputs, to the user terminal 3B, a virtual space which reflects a second update with respect to the shared virtual space.

In other words, in the information processing system 100A according to the present example embodiment, the server 2 first provides a virtual space which is shared by the user terminal 3A and the user terminal 3B. Then, the server 2 provides, to the user terminal 3A and the user terminal 3B, different virtual spaces in which different updates are reflected.

(Flow of Process S100B in Information Processing System 100A)

Figure 8:
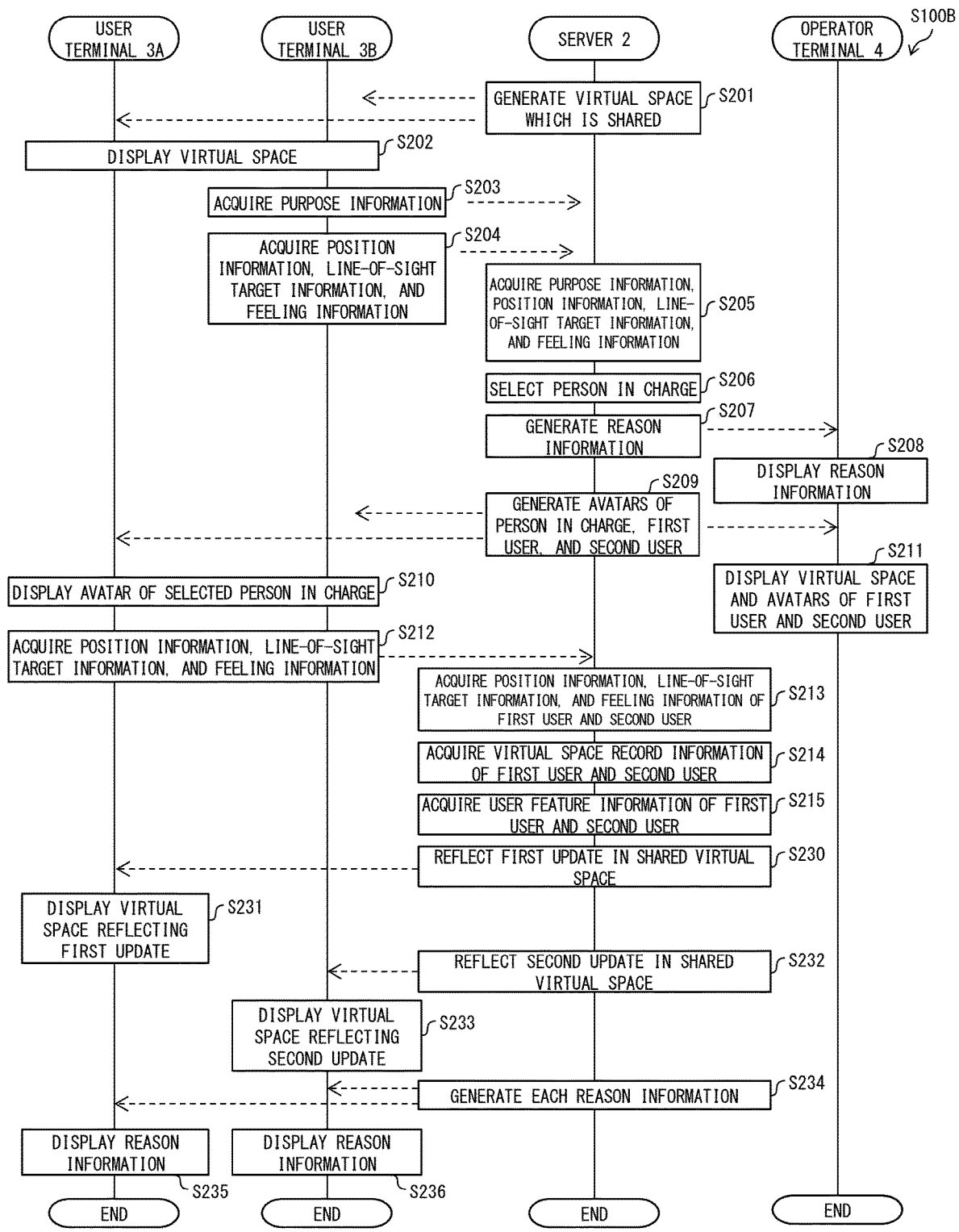
FIG. 8 is a flowchart illustrating a flow of a process in an information processing system according to a fourth example embodiment of the present invention.

The following description will discuss a flow of a process S100B in the information processing system 100A according to the present example embodiment, with reference to FIG. 8. FIG. 8 is a flowchart illustrating a flow of the process S100B in the information processing system 100A according to the present example embodiment.
(Steps S201 Through S215)

The processes in steps S201 through S215 are identical with those described in the foregoing example embodiments. Therefore, descriptions of such processes are omitted here.
(Step S230)

In step S230, the virtual space updating section 12 reflects, for the first user in the shared virtual space, a first update based on information acquired by the acquisition section 11 for the first user.

For example, the following description will discuss a case where a fact has been identified, based on information acquired by the acquisition section 11 for the first user, that the first user has had a negative feeling when the first user was positioned in a narrow place and the first user used a large place in the past. In this case, in step S230, the virtual space updating section 12 reflects a first update for updating the shared virtual space to a larger virtual space.

The virtual space updating section 12 supplies, to the output section 224, the virtual space in which the first update has been reflected. The output section 224 outputs, to the user terminal 3A, the virtual space supplied from the virtual space updating section 12.
(Step S231)

In step S231, the control section 32A of the user terminal 3A acquires the virtual space which has been output from the server 2. The control section 32A causes the display section 35A to display the acquired virtual space in which the first update has been reflected.
(Step S232)

In step S232, the virtual space updating section 12 reflects, for the second user in the shared virtual space, a second update based on information acquired by the acquisition section 11 for the second user.

The following description will discuss an example case in which, based on information acquired by the acquisition section 11 for the second user, a fact is identified that the second user had a negative feeling with respect to a male avatar included in the virtual space, and the second user used a female avatar in the past. In this case, in step S232, the virtual space updating section 12 reflects, based on information acquired by the acquisition section 11 for the second user, the second update for updating the shared virtual space to a virtual space in which a female avatar is disposed as an avatar of the person in charge.

The virtual space updating section 12 supplies, to the output section 224, the virtual space in which the second update has been reflected. The output section 224 outputs, to the user terminal 3B, the virtual space supplied from the virtual space updating section 12.

(Step S233)

In step S233, the control section 32B of the user terminal 3B acquires the virtual space which has been output from the server 2. The control section 32B causes the display section 35B to display the acquired virtual space in which the second update has been reflected.

(Step S234)

In step S234, the virtual space updating section 12 of the server 2 generates second reason information which (i) includes information that has contributed to the first update by the virtual space updating section 12 in step S230, and (ii) indicates a reason that the virtual space updating section 12 has updated the virtual space. Then, the virtual space updating section 12 supplies the generated second reason information to the output section 224. The output section 224 outputs, to the user terminal 3A, the second reason information which has been generated by the virtual space updating section 12.

Moreover, in step S234, the virtual space updating section 12 generates second reason information which (i) includes information that has contributed to the second update by the virtual space updating section 12 in step S232, and (ii) indicates a reason that the virtual space updating section 12 has updated the virtual space. Then, the virtual space updating section 12 supplies the generated second reason information to the output section 224. The output section 224 outputs, to the user terminal 3B, the second reason information which has been generated by the virtual space updating section 12.

(Step S235)

In step S235, the control section 32A of the user terminal 3A acquires second reason information which has been output from the server 2. The control section 32A causes the display section 35A to display the acquired second reason information.

(Step S236)

In step S236, the control section 32B of the user terminal 3B acquires second reason information which has been output from the server 2. The control section 32B causes the display section 35B to display the acquired second reason information.

Thus, in the information processing system 100A according to the present example embodiment, the server 2 acquires position information, feeling information, and virtual space record information for each of the first user and the second user who share the virtual space. Then, the server 2 outputs, based on the acquired pieces of information, a virtual space in which the first update has been reflected to the user terminal 3A used by the first user, and a virtual space in which the second update has been reflected to the user terminal 3B used by the second user. Therefore, in the information processing system 100A according to the present example embodiment, even in a case where there are a plurality of users, the server 2 can provide virtual spaces suitable for the respective plurality of users.

Fifth Example Embodiment

The second example embodiment through the fourth example embodiment have described the examples in which the server 2 and the user terminal 3 are used. However, one or more functions among the functions possessed by the server 2 may be realized by the user terminal 3. In other words, at least any of the acquisition section 11, the virtual space updating section 12, the selection section 221, the generation section 222, the updating section 223, and the output section 224 included in the control section 22 of the server 2 may be included in the control section 32 of the user terminal 3. The control section 32 of the user terminal 3 may include all of the functions of the acquisition section 11, the virtual space updating section 12, the selection section 221, the generation section 222, the updating section 223, and the output section 224 included in the control section 22 of the server 2.

Software Implementation Example

The functions of part of or all of the server 2, the user terminal 3 (3A and 3B), and the operator terminal 4 can be realized by hardware such as an integrated circuit (IC chip) or can be alternatively realized by software.

Figure 9:
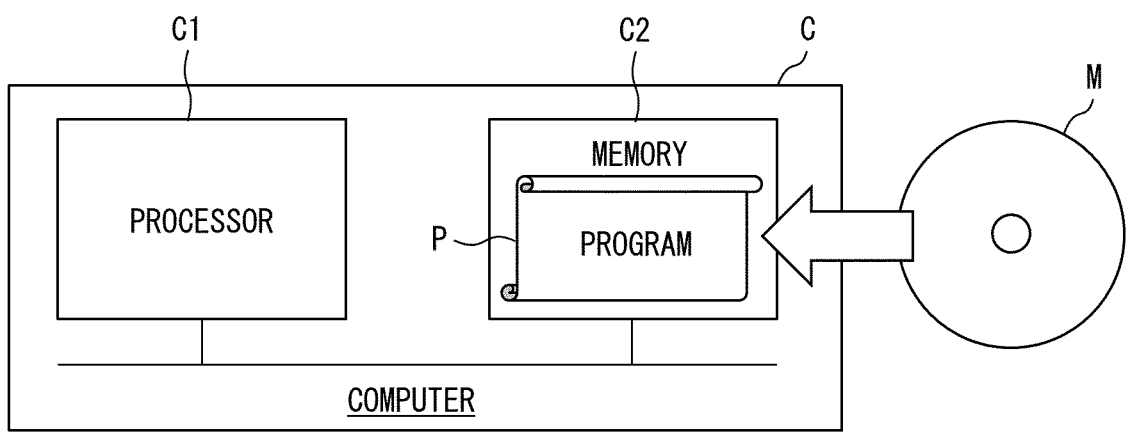
FIG. 9 is a block diagram illustrating an example of a hardware configuration of each of a server, a user terminal, and an operator terminal according to each of the example embodiments of the present invention.

In the latter case, each of the server 2, the user terminal 3 (3A and 3B), and the operator terminal 4 is realized by, for example, a computer that executes instructions of a program that is software realizing the foregoing functions. FIG. 9 illustrates an example of such a computer (hereinafter, referred to as "computer C"). The computer C includes at least one processor C1 and at least one memory C2. The memory C2 stores a program P for causing the computer C to function as the server 2, the user terminal 3 (3A and 3B), and the operator terminal 4. In the computer C, the processor C1 reads the program P from the memory C2 and executes the program P, so that the functions of the server 2, the user terminal 3 (3A and 3B), and the operator terminal 4 are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

Some of or all of the foregoing example embodiments can also be described as below. Note, however, that the present invention is not limited to the following supplementary notes.

Supplementary Note 1

A virtual space changing apparatus, including: an acquisition means that acquires position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user; and a virtual space changing means that changes a virtual space which is being used by the user or a state of the virtual space based on the position information, the feeling information, and the virtual space record information.

Supplementary Note 2

The virtual space changing apparatus according to supplementary note 1, in which: the virtual space which is being used by the user includes an avatar of a person in charge of dealing with the user; and the virtual space changing means changes the avatar.

Supplementary Note 3

The virtual space changing apparatus according to supplementary note 2, in which: the virtual space changing means changes the virtual space which is being used by the user or the state of the virtual space based on information which has been acquired by the acquisition means while the person in charge is dealing with the user with use of the avatar.

Supplementary Note 4

The virtual space changing apparatus according to any one of supplementary notes 1 through 3, further including: an output means that outputs reason information, the reason information (i) including information that has contributed to the changing by the virtual space changing means among pieces of information which have been acquired by the acquisition means and (ii) indicating a reason that the virtual space changing means has changed the virtual space or the state of the virtual space.

Supplementary Note 5

The virtual space changing apparatus according to any one of supplementary notes 1 through 4, in which: the virtual space changing means changes the virtual space by changing a lighting environment in the virtual space which is being used by the user, changing a color tone in the virtual space, changing a shape or a size of the virtual space, changing a virtual object included in the virtual space, or changing the virtual space to another virtual space.

Supplementary Note 6

The virtual space changing apparatus according to any one of supplementary notes 1 through 5, in which: the acquisition means further acquires line-of-sight target information which includes a line-of-sight target existing in a line-of-sight direction of the user in the virtual space or a record of the line-of-sight target; and the virtual space changing means changes the virtual space which is being used by the user or the state of the virtual space based further on the line-of-sight target information.

Supplementary Note 7

The virtual space changing apparatus according to any one of supplementary notes 1 through 6, in which: the acquisition means further acquires user feature information pertaining to a feature of the user; and the virtual space changing means updates, based further on the user feature information, the virtual space which is being used by the user.

Supplementary Note 8

The virtual space changing apparatus according to any one of supplementary notes 1 through 7, in which: the acquisition means acquires the position information, the feeling information, and the virtual space record information for each of a first user and a second user who share a virtual space; and the virtual space changing means changes, based on information acquired by the acquisition means for each of the first user and the second user, the virtual space which is shared or a state of the virtual space which is shared.

Supplementary Note 9

The virtual space changing apparatus according to supplementary notes 1 through 7, in which: the acquisition means acquires the position information, the feeling information, and the virtual space record information for each of a first user and a second user who share a virtual space; and the virtual space changing means reflects a first update for the first user in the virtual space which is shared, the first update being based on information which has been acquired by the acquisition means for the first user, and reflects a second update for the second user in the virtual space which is shared, the second update being based on information which has been acquired by the acquisition means for the second user.

Supplementary Note 10

A virtual space changing method, including: acquiring, by a virtual space changing apparatus, position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user; and changing, by the virtual space changing apparatus, a virtual space which is being used by the user or a state of the virtual space based on the position information, the feeling information, and the virtual space record information.

Supplementary Note 11

A program for causing a computer to function as a virtual space changing apparatus, the program causing the computer to function as: an acquisition means that acquires position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user; and a virtual space changing means that changes a virtual space which is being used by the user or a state of the virtual space based on the position information, the feeling information, and the virtual space record information.

Supplementary Note 12

A virtual space changing apparatus including at least one processor, the at least one processor carrying out: an acquisition process of acquiring position information, feeling information, and virtual space record information, the position information including a position of a user in a virtual space or a record of the position, the feeling information including a feeling of the user or a record of the feeling, and the virtual space record information including a record of a virtual space which has been used by one or both of the user and another user; and a virtual space changing process of changing a virtual space which is being used by the user or a state of the virtual space based on the position information, the feeling information, and the virtual space record information.

Note that the virtual space changing apparatus can further include a memory. The memory can store a program for causing the at least one processor to carry out the acquisition process and the virtual space changing process. The program can be stored in a computer-readable non-transitory tangible storage medium.

REFERENCE SIGNS LIST

1: Virtual space changing apparatus
2: Server
3, 3A, 3B: User terminal
4: Operator terminal
100, 100A: Information processing system
221: Selection section
222: Generation section
223: Updating section
224: Output section

The invention claimed is:

1. A virtual space changing apparatus comprising at least one processor, the at least one processor carrying out:
an acquisition process of acquiring position information, feeling information, and first virtual space record information, the position information including a position of a first user in a first virtual space or a record of the position, the feeling information including a feeling of the first user or a record of the feeling, and the first virtual space record information including a record of a second virtual space which has been used by one or both of the first user and a second user different from the first user;
a virtual space changing process of changing the first virtual space which is being used by the first user or a state of the first virtual space based on the position information, the feeling information, and the first virtual space record information; and
an output process of outputting reason information, the reason information (i) including information that has contributed to the changing in the virtual space changing process among pieces of information which have been acquired in the acquisition process and (ii) indicating a reason that the first virtual space or the state of the first virtual space has been changed in the virtual space changing process.

2. The virtual space changing apparatus according to claim 1, wherein:
the first virtual space which is being used by the first user includes an avatar of a person in charge of dealing with the first user; and
in the virtual space changing process, the at least one processor changes the avatar.

3. The virtual space changing apparatus according to claim 2, wherein:
in the virtual space changing process, the at least one processor changes the first virtual space which is being used by the first user or the state of the first virtual space based on information which has been acquired, while the person in charge is dealing with the first user with use of the avatar, in the acquisition process.

4. The virtual space changing apparatus according to claim 1, wherein:
in the virtual space changing process, the at least one processor changes the first virtual space by changing a lighting environment in the first virtual space which is being used by the first user, changing a color tone in the first virtual space, changing a shape or a size of the first virtual space, changing a virtual object included in the first virtual space, or changing the first virtual space to another virtual space.

5. The virtual space changing apparatus according to claim 1, wherein:
in the acquisition process, the at least one processor further acquires line-of-sight target information which includes a line-of-sight target existing in a line-of-sight direction of the first user in the first virtual space or a record of the line-of-sight target; and
in the virtual space changing process, the at least one processor changes the first virtual space which is being used by the first user or the state of the first virtual space based further on the line-of-sight target information.

6. The virtual space changing apparatus according to claim 1, wherein:
in the acquisition process, the at least one processor further acquires first user feature information pertaining to a feature of the first user; and
in the virtual space changing process, the at least one processor updates, based further on the first user feature information, the first virtual space which is being used by the first user.

7. The virtual space changing apparatus according to claim 1, wherein:
in the acquisition process, the at least one processor acquires the position information, the feeling information, and the first virtual space record information for each of the first user and the second user who share a virtual space; and in the virtual space changing process, the at least one processor changes, based on information acquired in the acquisition process for each of the first user and the second user, the virtual space which is shared or a state of the virtual space which is shared.

8. The virtual space changing apparatus according to claim 1, wherein:

in the acquisition process, the at least one processor acquires the position information, the feeling information, and the first virtual space record information for each of the first user and the second user who share a virtual space; and in the virtual space changing process, the at least one processor:

reflects a first update for the first user in the first virtual space which is shared, the first update being based on information which has been acquired in the acquisition process for the first user, and reflects a second update for the second user in the first virtual space which is shared, the second update being based on information which has been acquired in the acquisition process for the second user.

9. A virtual space changing method, comprising:

acquiring, by a virtual space changing apparatus, position information, feeling information, and first virtual space record information, the position information including a position of a first user in a first virtual space or a record of the position, the feeling information including a feeling of the first user or a record of the feeling, and the first virtual space record information including a record of a second virtual space which has been used by one or both of the first user and a second user different from the first user;

changing, by the virtual space changing apparatus, athe first virtual space which is being used by the first user or a state of the first virtual space based on the position information, the feeling information, and the first virtual space record information; and outputting reason information by the virtual space changing apparatus, the reason information (i) including information that has contributed to the changing of the first virtual space or the state of the first virtual space among pieces of information which have been acquired in the acquiring and (ii) indicating a reason that the first virtual space or the state of the first virtual space has been changed.

10. A non-transitory storage medium storing a program for causing a computer to function as a virtual space changing apparatus, the program causing the computer to carry out:

an acquisition process of acquiring position information, feeling information, and first virtual space record information, the position information including a position of a first user in a first virtual space or a record of the position, the feeling information including a feeling of the first user or a record of the feeling, and the first virtual space record information including a record of a second virtual space which has been used by one or both of the first user and a second user different from the first user;

a virtual space changing process of changing the first virtual space which is being used by the first user or a state of the first virtual space based on the position information, the feeling information, and the first virtual space record information; and an output process of outputting reason information, the reason information (i) including information that has contributed to the changing in the virtual space changing process among pieces of information which have been acquired in the acquisition process and (ii) indicating a reason that the first virtual space or the state of the first virtual space has been changed in the virtual space changing process.

* * * * *